Dec. 21, 1926.
K. E. KELLENBERGER
CAR RETARDER
Filed August 11, 1926
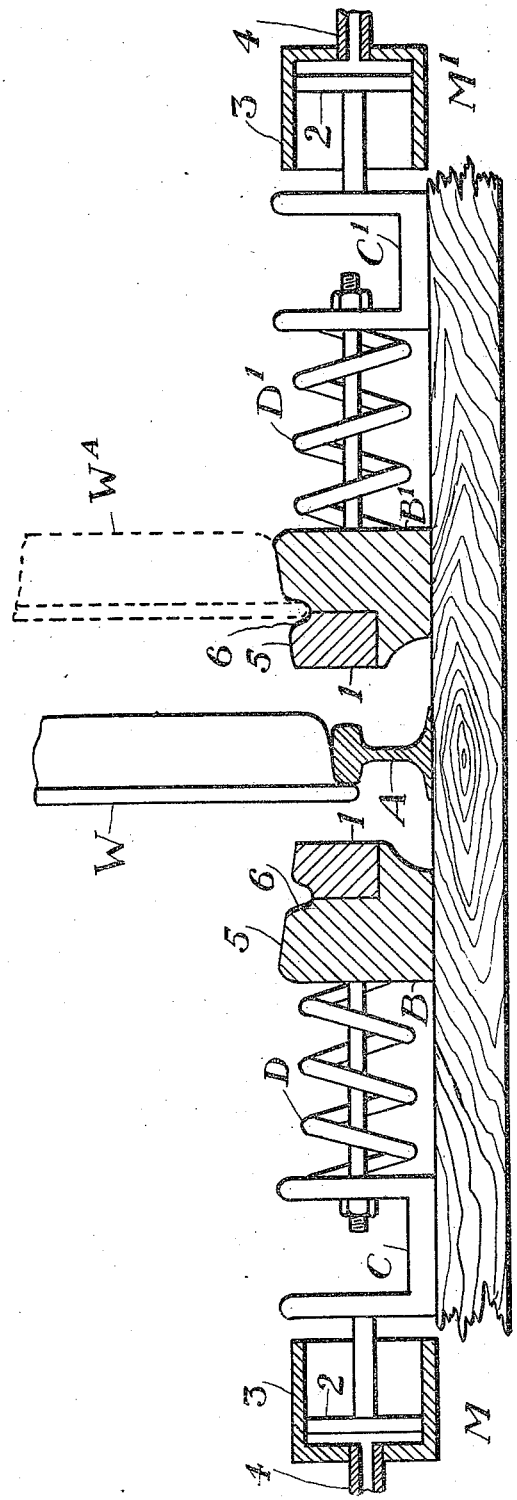
INVENTOR:
K. E. Kellenberger
by A. F. Vincell
His Attorney Patented Dec. 21, 1926.

1,611,200

UNITED STATES PATENT OFFICE.

KEITH E. KELLENBERGER, OF WILKINSBURG, PENNSYLVANIA, ASSIGNOR TO THE UNION SWITCH & SIGNAL COMPANY, OF SWISSVALE, PENNSYLVANIA, A CORPORATION OF PENNSYLVANIA.

CAR RETARDER.

Application filed August 11, 1926. Serial No. 128,622.

My invention relates to car retarders, that is to devices located in the trackway for reducing the speed of railway cars.

I will describe one form of car retarder embodying my invention, and will then point out the novel features thereof in claims.

The accompanying drawing is a view showing in vertical cross section one form of car retarder embodying my invention.

Referring to the drawing, the reference character A designates one rail of a stretch of railway track. Associated with this rail is a car retarder comprising two brake bars B and $B^1$, located on opposite sides of the track rail. The bar B is operatively connected with a channel C by means including a spring D. The channel C is operated by a motor device M, here shown as a cylinder 3 containing a reciprocable piston 2 operatively connected with the channel. Fluid pressure, usually air, is at times supplied to the cylinder 3, through a pipe 4, to move the channel, and therefore the bar B, toward the rail. A similar fluid pressure motor device $M^1$ operates the channel $C^1$ to move bar $B^1$ toward the rail. The supply of fluid pressure to the pipes 4 of the motor devices M and $M^1$ is controlled by any suitable means not shown in the drawing.

The parts are so proportioned that when motor devices M and $M^1$ are both supplied with fluid pressure to urge bars B and $B^1$ inwardly, these bars engage the sides of the wheel W of a car passing along rail A. The purpose of the springs D and $D^1$ is to limit the pressure exerted upon the sides of the wheel to the force transmitted by the springs. In the form here shown the braking bars B and $B^1$ are provided with removable braking faces 1, which may be replaced when worn by the friction due to the braking operation.

Although I have illustrated only one wheel of the car, and one track rail, it is understood that car retarding apparatus similar to that here shown will usually also be provided for the other rail to engage the wheels on the other side of the car.

In order to control the motion of cars of the usual size of lading, it is necessary to urge the brake bars against the sides of the car wheels with considerable force. Even with brake bars of the most careful design there may be a tendency at times for the wheels of the car to "pinch" between the brake bars and to ride up on the tops of the bars, thereby causing a derailment of the car. Should this happen, the wheels of the car might be forced completely over the brake bars and would then drop down on the springs which connect the braking bars with the channels C and might cause considerable damage to the car retarding apparatus and to the car. Furthermore, a car thus derailed is very difficult to replace upon the rails because in order to replace the car, the wheels must be raised far enough for the flanges to clear the brake bars before the car can be moved transversely to the trackway to replace the wheels upon the rails.

To avoid this undesirable occurrence I prefer to construct the brake bars B and $B^1$ as shown in the drawing, with the upper faces 5 of the bars inclined downwardly at a small angle toward the rail. I also provide the upper face of each bar with a longitudinally extending groove 6 adapted to receive the flange of a car wheel. With the bars constructed in this manner, if a car is derailed, the inclined faces 5 tend to hold the wheel in a position over the rail so that when the braking bars are retracted the wheel will return to the rail by virtue of the weight of the car. If, however, the wheel does ride up on one of the brake bars, the flange of the wheel will drop into a groove 6 in the brake bar as indicated in broken lines at $W^A$ on the drawing.

It will therefore be seen that with a car retarder constructed according to my invention the car wheel is prevented from travelling more than a limited distance away from the track rail in case of derailment, thus making it an easy matter to re-rail the car. It follows that considerable pressures may be safely used with car retarders embodying my invention, for if the car is derailed the wheel can not be forced over the brake bar to destroy or to interfere with the operation of the car retarding apparatus.

Although I have herein shown and described only one form of car retarder embodying my invention, it is understood that various changes and modifications may be made therein within the scope of the appended claims without departing from the spirit and scope of my invention.

Having thus described my invention, what I claim is:

1. A car retarder comprising a brake bar located in the trackway and at times urged into engagement with the side of a car wheel, the upper face of said bar having a longitudinal groove for receiving the wheel flange should the car become derailed.

2. A car retarder comprising a brake bar located parallel to a track rail and at times urged into engagement with the side of a car wheel on the rail, the bar being provided on its upper face with means for limiting the movement of the wheel away from the rail should the car become derailed.

3. A car retarder comprising a brake bar located parallel to a track rail and at times urged into engagement with the side of a car wheel on the rail, the upper face of the bar being inclined downwardly toward the rail and having a longitudinal groove for receiving the wheel flange should the car become derailed.

4. A car retarder comprising a pair of braking bars located on opposite sides of a track rail and at times urged toward the rail to engage the sides of a car wheel, the upper faces of both bars being inclined downwardly toward the rail and each having a longitudinal groove to receive the flange of the wheel and limit the motion of the wheel away from the rail in case of derailment.

In testimony whereof I affix my signature.

KEITH E. KELLENBERGER.